US008001188B2

(12) United States Patent
Miyake et al.

(10) Patent No.: US 8,001,188 B2
(45) Date of Patent: Aug. 16, 2011

(54) SERVER DEVICE, CLIENT DEVICE, AND PROCESS EXECUTION METHOD

(75) Inventors: Motoharu Miyake, Yokosuka (JP); Tomohiro Nakagawa, Yokosuka (JP); Hiroshi Inamura, Yokohama (JP)

(73) Assignee: NTT Docomo, Inc., Tokyo (JP)

( * ) Notice: Subject to any disclaimer, the term of this patent is extended or adjusted under 35 U.S.C. 154(b) by 1175 days.

(21) Appl. No.: 11/210,719

(22) Filed: Aug. 24, 2005

(65) Prior Publication Data

US 2006/0069804 A1 Mar. 30, 2006

(30) Foreign Application Priority Data

Aug. 25, 2004 (JP) ................................. 2004-245433

(51) Int. Cl.
*G06F 15/16* (2006.01)
(52) U.S. Cl. ........................................ 709/205; 709/229
(58) Field of Classification Search .................... 709/205
See application file for complete search history.

(56) References Cited

U.S. PATENT DOCUMENTS

| | | | | |
|---|---|---|---|---|
| 6,058,418 | A * | 5/2000 | Kobata | 709/221 |
| 6,958,998 | B2 * | 10/2005 | Shorey | 370/395.42 |
| 7,143,163 | B1 * | 11/2006 | Bleichenbacher et al. | 709/225 |
| 7,197,639 | B1 * | 3/2007 | Juels et al. | 713/168 |
| 7,346,069 | B2 * | 3/2008 | Lee et al. | 370/431 |
| 2002/0016835 | A1 * | 2/2002 | Gamerman | 709/223 |
| 2002/0078350 | A1 * | 6/2002 | Sandhu et al. | 713/168 |
| 2003/0172159 | A1 | 9/2003 | Schuba et al. | |
| 2003/0187732 | A1 * | 10/2003 | Seta | 705/14 |
| 2004/0042476 | A1 * | 3/2004 | Peacock | 370/412 |
| 2004/0093371 | A1 * | 5/2004 | Burrows et al. | 709/201 |
| 2004/0125784 | A1 * | 7/2004 | Lee et al. | 370/345 |
| 2004/0136379 | A1 * | 7/2004 | Liao et al. | 370/395.21 |
| 2007/0008884 | A1 * | 1/2007 | Tang | 370/230 |

OTHER PUBLICATIONS

Deanna Koike; Client Puzzles as a Defense Against Network Denial of Service; Dec. 4, 2002, 10 Pages total.*
Juels, A. et al., "Client Puzzles: A Cryptographic Countermeasure Against Connection Depletion Attacks", RSA Laboratories, *Proceedings of NDSS (Networks and Distributed Security Systems) '99*, 1999, 16 pages.
Wang, X. et al, "Defending Against Denial-of-Service Attacks with Puzzle Auctions", *Proceedings of the IEEE Symposium on Security and Privacy*, May 11, 2003, pp. 78-92 (total 15 pages).
Office Action by EPO dated Apr. 28, 2006.
Japanese Office Action issued in Japanese Patent Application No. 2004-245433, dated Apr. 27, 2010 (8 pgs., w/full English translation).

* cited by examiner

*Primary Examiner* — Yasin Barqadle
*Assistant Examiner* — Richard G Keehn
(74) *Attorney, Agent, or Firm* — Brinks Hofer Gilson & Lione (57) ABSTRACT

A server device 20 requests a client device 30 to execute one of a plurality of computations having different degrees of difficulty. Client device 30 identifies, based on an amount of computation required for each of said plurality of computations, a computation to be executed and executes the computation. Client device 30, when requesting execution of a given process to server device 20, transmits a result of the computation to server device 20. Server device 20, when the computation result is correct, executes a predetermined process according to a priority based on an amount of the computation.

22 Claims, 6 Drawing Sheets

SERVER DEVICE, CLIENT DEVICE, AND PROCESS EXECUTION METHOD

This application claims priority under 35 U.S.C. §119 to Japanese Patent Application No. 2004-245433 filed Aug. 25, 2004, the entire content of which is hereby incorporated by reference.

BACKGROUND

1. Technical Field

The present invention relates to a technique for causing a server device to execute a process in response to a request from a client device and a server device.

2. Background Information

In recent years, a variety of communication services which utilize the Internet have come into use. One example of a communication protocol which is used for sending and receiving data over the Internet is TCP (Transmission Control Protocol). TCP is a connection-type communication protocol which enables highly reliable data communication to be carried out over the Internet. Under TCP, a data transmitting device (hereinafter, "server device") and a data receiving device (hereinafter, "client device") exchange connection data (hereinafter, "connection identifier") prior to transmission of content data. The exchanged connection identifier is used to specify a communication path (hereinafter, "connection") to thereby establish a connection for transmission of content data. Examples of connection identifiers include: a communication address assigned to a server device or a client device; data indicating a communication port (e.g. a communication port number) used by the devices for respectively transmitting and receiving data; or an initial value of a sequence number. Under TCP, a connection is established using a procedure referred to as a "3-way handshake". A general description of this procedure follows.

Figure 10:
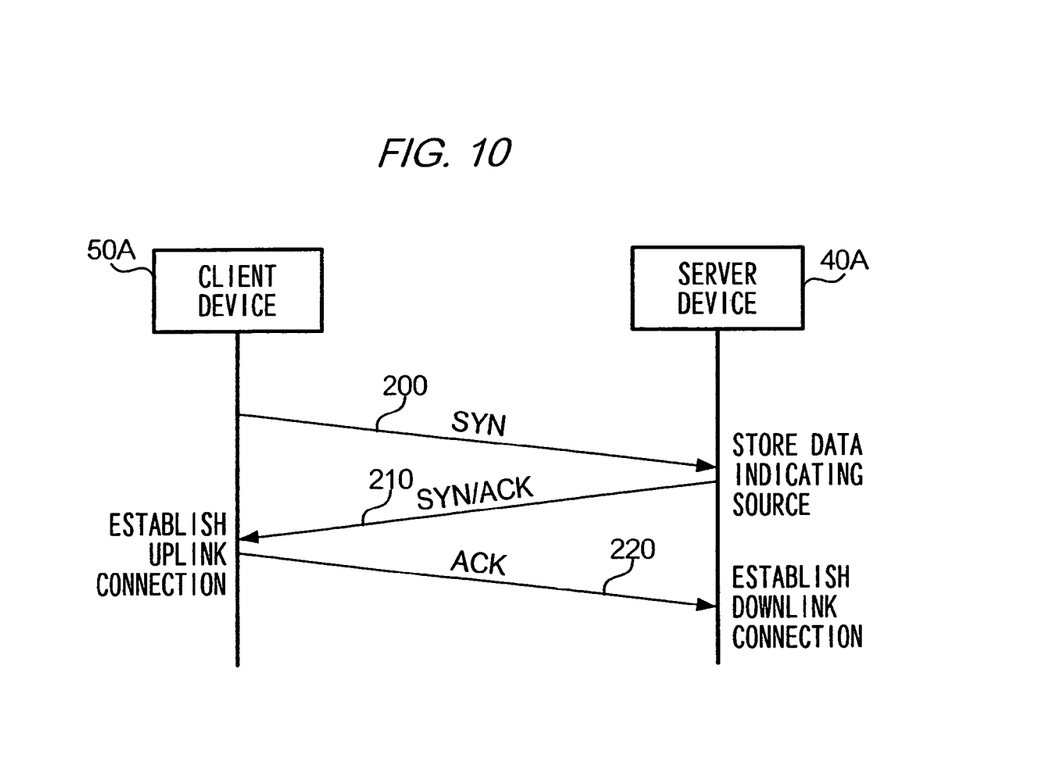
FIG. 10 is a diagram describing the conventional 3-way handshake.

FIG. 10 provides an overview of a 3-way handshake executed by a server device 40A and a client device 50A. Each of the devices is capable of communicating under TCP. It is assumed for the purposes of this explanation that a user who wishes to obtain content data from server device 40A performs a predetermined operation such as inputting data (e.g., URL) representing a communication address of server device 40A and a communication protocol to be used for acquiring the desired content data. Client device 50A first transmits to server device 40A a SYN message 200, as shown in FIG. 10. SYN message 200 is used for requesting establishment of a connection when data is to be transmitted from server device 40A to client device 50A (hereinafter, "downlink connection"); and the message includes a connection identifier for the downlink connection.

Server device 40A, upon receiving SYN message 200, allocates a computer resource (hereinafter, "resource") for establishing a connection with the source of the SYN message 200, client device 50A. Specifically, server device 40A writes, in a memory device such as RAM (Random Access Memory), and data (e.g., a connection identifier of the downlink connection mentioned above) for identifying a correspondent device (i.e., client device 50A). Server device 40A then transmits to client device 50A a SYN/ACK message 210 indicating receipt of SYN message 200, and also transmits a request for establishing a connection in the reverse direction (hereinafter, "uplink connection"). The uplink connection is used when data is transferred from client device 50A to server device 40A; and the SYN/ACK message 210 includes a connection identifier for the uplink connection. Server device 40A retransmits SYN/ACK message 210 by referring to stored data in the memory device in a case that a message acknowledging a receipt of SYN/ACK message 210 (hereinafter, "ACK") is not received within a predetermined time since the transmission of the message 210.

Client device 50A, upon receiving SYN/ACK message 210, reads the connection identifier in the SYN/ACK message 210 and establishes a connection (i.e., the uplink connection) in accordance with the connection identifier. Client device 50A then transmits to server device 40A an ACK 220 indicating receipt of the SYN/ACK message 210. ACK 220 includes a connection identifier for the downlink connection. Upon receiving ACK 220, server device 40A establishes the uplink connection identified by the connection identifier included in ACK 220, deletes data identifying the correspondent device from the memory device, and awaits receipt of a message transmitted through the downlink connection from the client device 50A, such as a request for transmitting data (e.g., a message containing a HTTP GET method).

It is to be noted that since resources of server device 40A, such as a capacity of a memory device, are limited, a number of connection identifiers (i.e., data indicating a correspondent device with which a connection is about to be established) which can be stored in the memory device is also accordingly limited. Thus, a number of ACKs 220 from client devices 50A for which server device 40A can wait is limited to a number of connection identifiers which can be retained at the server. It is this limitation that makes a server vulnerable to abuse. Namely, a denial of service attack can be launched against the server by a malicious client device by sending from the device a large number of SYN messages 200 to the server for queuing, thereby exhausting the resources of the server. Such an attack is referred to as a "SYN Flood Attack."

When a SYN Flood Attack is launched, a malicious client device which is the source of the attack continuously transmits a large number of SYN messages 200 to server device 40A. When the server sends or attempts to send responsive SYN/ACK messages 210 no ACK 220 is forthcoming from the client device. The server therefore retains for a set time period data identifying a correspondent device, assuming that a connection between the correspondent device is not yet established, and awaits an ACK 220. When a SYN Flood Attack is attempted, a number of connection identifiers queued at the server soon reaches an upper limit. As a result, the server device is no longer able to accept connection requests from client devices; and communication services cannot be provided.

Various methods have been proposed for dealing with SYN Flood Attacks. They include a client puzzle protocol disclosed in Ari Juels and John Brainard (RSA Labs), "Client Puzzles: A Cryptographic Defense Against Connection Depletion Attacks", and a client puzzle auction disclosed in XiaoFeng Wang, Michael K. Reiter, "Defending Against Denial-of-Service Attack with Puzzle Auctions", Proceedings of the 2003 IEEE Symposium on Security and Privacy, 2003. In the following, description will be given of these techniques with reference to the attached figures.

Figure 11:
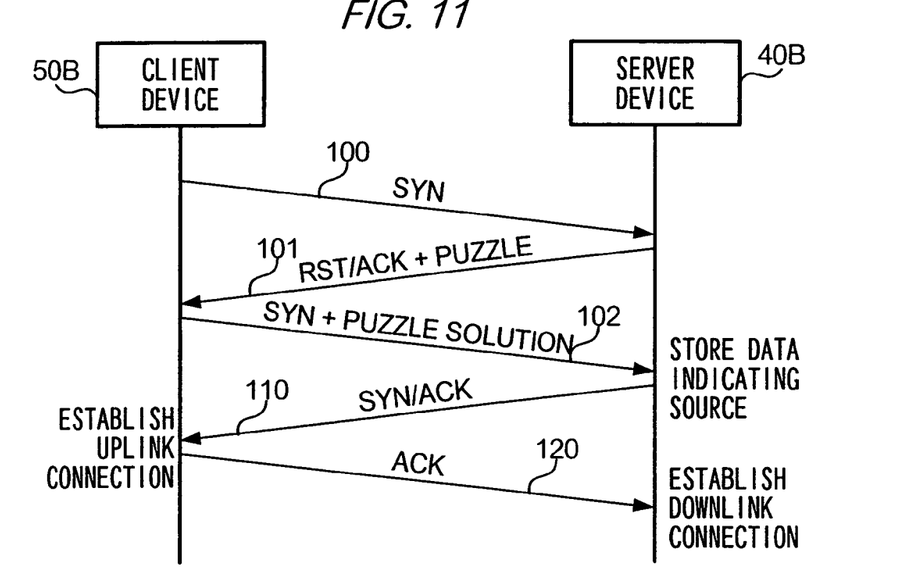
FIG. 11 is a diagram describing a client puzzle protocol disclosed in Juels, et. al.

FIG. 11 is a diagram providing an overview of a client puzzle protocol. In the figure, a server device 40B and a client device 50B are communication devices which establish a connection according to the client puzzle protocol. Server device 40B differs from server device 40A of FIG. 10 in that the device 40B does not store data showing a source of SYN message 100 upon reception, and that the device 40B transmits, upon receiving SYN message 100, transmits a message (a RST/ACK message 101 of FIG. 11) requesting execution of a predetermined computation and a reply including a result of the computation. RST/ACK message 101 includes data representing the predetermined computation (hereinafter, "client puzzle").

Client device 50B, upon receiving RST/ACK message 101, performs a computation designated by the client puzzle contained in RST/ACK message 101, and transmits to server device 40B a SYN message 102 after writing a computation result in the message. In the following, execution of a computation designated by a client puzzle will be referred to as "to solve a client puzzle," and a computation result as "a solution of a client puzzle." When server device 40B receives SYN message 102, it determines whether the solution contained in SYN message 102 is correct; and the device 40B establishes a connection between client device 50B in accordance with a procedure that is the same as that employed in a 3-way handshake method, only when the solution is determined to be correct.

Thus, server device 40B transmits a client puzzle to client device 50B which has requested establishment of a connection, and does not establish a connection until the correct solution of the client puzzle is returned from client device 50B. A client device attempting a SYN Flood Attack on server 40B by transmitting a large number of SYN messages can no longer continue the attack unless it submits to server device 40B a correct solution to a client puzzle returned from the server as a response to each SYN message. To continue a SYN Flood Attack on server 40B, a client device has to solve a number of client puzzles, which means that the client device must have large resources available for computation. Consequently, the client device becomes incapable of continuing to transmit SYN messages. Thus, according to the client puzzle protocol, a SYN Flood Attack can be effectively handled.

A crucial factor in implementing the client puzzle protocol is that an amount of computation designated by a client puzzle is appropriately tuned ("an amount of computation" will be hereinafter referred to as "client puzzle difficulty"). In a case that client puzzle difficulty is set too low, i.e., the computation amount is too small, it is possible for a client device to obtain a solution for a client puzzle by using relatively few resources; and as a consequence, a SYN Flood Attack cannot be defended against. Conversely, when client puzzle difficulty is too high, i.e., a computation amount is too large, it would take time even for a legitimate client device not attempting a SYN Flood Attack to solve a client puzzle; as a result, such a client device will have difficulty in utilizing a communication service provided by a server device.

In reality, however, it is not readily possible to tune an appropriate level of client puzzle difficulty suited for each client device in an existing communication system. Generally, there is used in an existing communication system a mixture of various client devices with different degrees of capability, such as personal computers and PDA (Personal Digital Assistance)s, but an appropriate level of client puzzle difficulty depends on the capability of each client device. The client puzzle auction proposed by Wang, et. al has provided, as its object, a solution for such a problem existing in the client puzzle protocol. Description is now given of the client puzzle auction.

Figure 12:
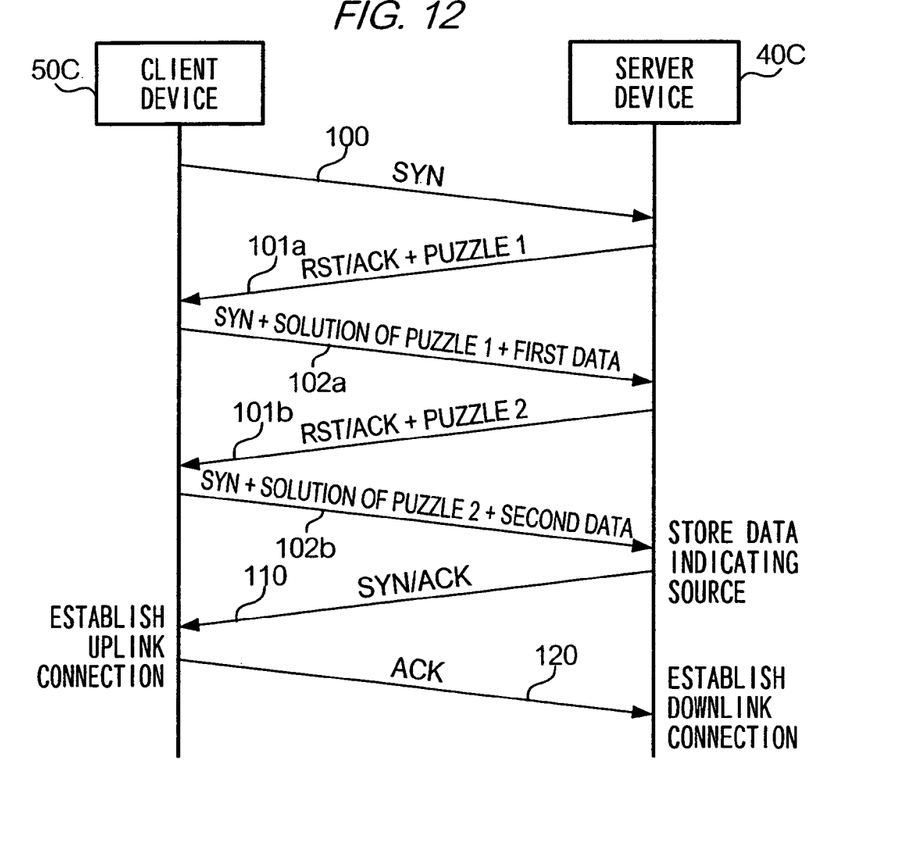
FIG. 12 is a diagram describing a client puzzle auction disclosed in Wang, et. al.

FIG. 12 is a diagram for describing an overview of the client puzzle auction. A server device 40C and a client device 50C are communication devices which establish a connection according to the client puzzle auction. Client device 50C of FIG. 12 is adapted to transmit either one of first data or second data when transmitting a SYN message 102 (102a or 102b) containing an obtained solution of a client puzzle, the first data being a request for transmission for a client puzzle with higher difficulty and the second data being a request for not transmitting any more difficult client puzzle.

Server device 40C, when the first data is included in SYN message 102 received from client device 50C, generates a client puzzle with higher difficulty and transmits a RST/ACK message 101b containing the generated client puzzle. In a case where SYN message 102 received from client device 50C includes the second data, server device 40C initiates establishment of a connection according to a conventional 3-way handshake.

According to the client puzzle auction, server device 40C of FIG. 12, when it receives SYN messages 102 from a plurality of client devices, gives a higher priority to SYN message 102 including a solution for a client puzzle with higher level of difficulty when handling a request and establishes a connection preferentially with a client device which is the source of such a SYN message 102. Since generally large resources are consumed for solving a client puzzle with high level of difficulty, transmission frequency of connection open requests will be reduced. A higher priority is given as a compensation for a client device which has accepted a higher process burden and which is rendered capable of transmitting connection establishment requests less frequently. In other words, client server 50C must accept commitment of large resources if it wishes to have a connection open request it transmits to be handled by server device 40C with higher priority.

As described above, since committing large resources is an obstacle for a client device to perform a SYN Flood Attack, the client puzzle auction enables effective defense against a SYN Flood Attack. Further, since each client device 50C is enabled to receive a client puzzle suited for its own process capability and solve the puzzle, the above described problem existing in the client puzzle protocol is also solved. Thus, according to the client puzzle auction, a client device is enabled to shoulder a burden depending on its process capability, and a connection is established according to a priority corresponding to a burden each client device has accepted.

Nevertheless, when the client puzzle auction is used, a number of messages exchanged between a server device and a client device (hereinafter, "communication traffic") is increased when compared with the conventional 3-way handshake and the client puzzle protocol, as obvious from what is shown in FIGS. 10, 11, and 12. Such an increase of communication traffic between a server device and a client device is not welcome, since it potentially becomes a factor for causing congestion in a communication network through which communication between the two devices is performed.

BRIEF SUMMARY OF THE INVENTION

The present invention has been envisioned in view of the problem described above, and has as its object the provision of a technique for enabling the shouldering of a burden by client devices depending on the process capability of each device, and also enabling the server device to implement a process request from client devices according to priority corresponding to a burden each client device has accepted to shoulder, while avoiding the increase in communication traffic between a client device and a server device.

To solve the above-stated problem, in one aspect, the present invention provides a server device comprising: transmission means for transmitting to correspondent client devices, a first message including a plurality of client puzzles, each of the plurality of client puzzles including a data set for computation, and the data set for computation for each of the puzzles requiring a different amount of computation, the plurality of client puzzles being transmitted with a request for computation of at least one data set for computation of the puzzles, and with a request for transmission of a solution for the at least one data set for computation; determination means for determining, when a second message requesting execution of a given process and including a computation result for the at least one data set for computation is received from each of the correspondent client devices, whether a received computation result is correct; and process execution means for identifying, when the determination means determines that the computation result is correct, an amount of computation carried out by each of the client devices for the at least one data set for computation, and for executing the requested given process prioritized on the basis of the identified computation amount.

In a preferred embodiment, the transmission means may transmit the first message in response to a preliminary message requesting only execution of the given process, to a client device being a source of the preliminary message.

In another preferred embodiment, the first message is provided with a predetermined area in which data is contained only when a source and a destination of the first message start a communication, the predetermined area containing appendix data for notifying the destination of detailed modes of the communication; and the transmission means may transmit the first message including, in the predetermined area, the plurality of client puzzles. Preferably, the transmission means may transmit the message according to TCP (Transmission Control Protocol); and the predetermined area may be an Options field.

In another aspect, the present invention provides a program and a computer readable recording medium storing such a program, the program for causing a computer device to function as the above transmission means, the determination means and the process execution means.

To solve the above object, the present invention further provides a server device comprising: communication means; and control means, wherein the control means performs: a first process of transmitting by the communication means to correspondent client devices, a first message including a plurality of client puzzles, each of the plurality of client puzzles including a data set for computation, and the data set for computation for each of the puzzles requiring a different amount of computation, the plurality of client puzzles being transmitted with a request for computation of at least one data set for computation of the puzzles, and with a request for transmission of a solution for the at least one data set for computation; a second process of determining, when a second message requesting execution of a given process and including a computation result for the at least one data set for computation is received by the communication means from each of the correspondent client devices, whether a received computation result is correct; and a third process of identifying, when it is determined in the second process that the computation result is correct, an amount of computation carried out by each of the client devices for the at least one data set for computation, and for executing the requested given process prioritized on the basis of the identified computation amount.

The present invention further provides a program and a computer readable recording medium storing such a program, the program for causing a computer device to execute the above first, second, and third processes.

In still another aspect, the present invention provides a client device comprising: selection means for, when a first message including a plurality of client puzzles, each of the plurality of client puzzles including a data set for computation, and the data set for computation for each of the puzzles requiring a different amount of computation, is received from a correspondent server device with a request for computation of at least one data set for computation of the puzzles, and with a request for transmission of a solution for the at least one data set for computation, selecting a computation to be executed based on an amount of computation, after identifying, based on each puzzle, a computation amount to be performed for each of the computations; computation execution means for executing the computation selected by the selection means; and transmission means for, when requesting the server device to execute a given process, transmitting to the server device a second message with the process execution request, the second message including a computation result obtained by the computation execution means.

In a preferred embodiment, the transmission means, when requesting execution of the given process before receiving the first message, transmits a preliminary message to the server device including only the process execution request.

Further, the present invention provides a program and a computer readable recording medium storing such a program, the program for causing a computer device to function as the above selection means, computation execution means, and transmission means.

In another aspect, the present invention provides a client device comprising: communication means; and control means, wherein the control means performs: a first process of, when a first message including a plurality of client puzzles, each of the plurality of client puzzles including a data set for computation, and the data set for computation for each of the puzzles requiring a different amount of computation, is received by the communication means from a correspondent server device with a request for computation of at least one data set for computation of the puzzles, and with a request for transmission of a solution for the at least one data set for computation, selecting a computation to be executed based on an amount of computation, after identifying, based on each puzzle, a computation amount to be performed for each of the computations; a second process of executing the computation selected in the first process; and a third process of, when requesting the server device to execute a given process, transmitting to the server device by the communication means a second message with the process execution request, the second message including a computation result obtained in the second process.

Still further, the present invention provides a program and a computer readable recording medium storing such a program, the program for causing a computer device to execute the above first, second, and third processes.

In still another aspect, the present invention provides a process execution method comprising: a first step of transmitting from a server device to correspondent client devices, a first message including a plurality of client puzzles, each of the plurality of client puzzles including a data set for computation, and the data set for computation for each of the puzzles requiring a different amount of computation, the first message including a request for computation of at least one data set for computation of the puzzles, and a request for transmission of a solution for the at least one data set for computation; a second step of selecting, at each client device that has received the first message, a computation to be executed, after identifying, based on each client puzzle, an amount of computation to be performed for each of the computations, the selection being made based on each identified computation amount, executing the selected computation, and transmitting a second message requesting execution of a given process to the server device, the second message including a result of the executed computation; and a third process of determining, at the server device upon receipt of the second message, whether the computation result is correct, and, when it is determined to be correct, identifying, based on the computation result, an amount of computation executed by the each client device which is a source of the second message, and for executing the given process according to a priority determined on the basis of the identified computation amount.

According to such a server device, a client device, and a process execution method, a computation included in one of client puzzles written in a first message transmitted from the server device is executed by the client device, and a result of the computation is written in a second message for transmission to the server device with a request for execution of a given process. The server device, upon receiving the second message, when the computation result written in the second message is correct, identifies an amount of computation carried out by the client device for the computation, and executes the requested given process prioritized on the basis of the identified computation amount.

According to the present invention, it enables client devices to shoulder a burden depending on the process capability of each device, and also enabling the server device to implement a process request from client devices according to priority corresponding to a burden each client device has accepted to shoulder.

Further, according to the present invention, since a plurality of client puzzles designating a plurality of types of computations requiring a different computation amount is transmitted to a client device collectively, no increase in communication traffic is caused between a client device and a server device.

DETAILED DESCRIPTION OF THE PREFERRED EMBODIMENTS

In the following, description will be given of a preferred embodiment of the present invention with reference to the attached drawings.

A. Configuration

A-1: Configuration of a Communication System

Figure 1:
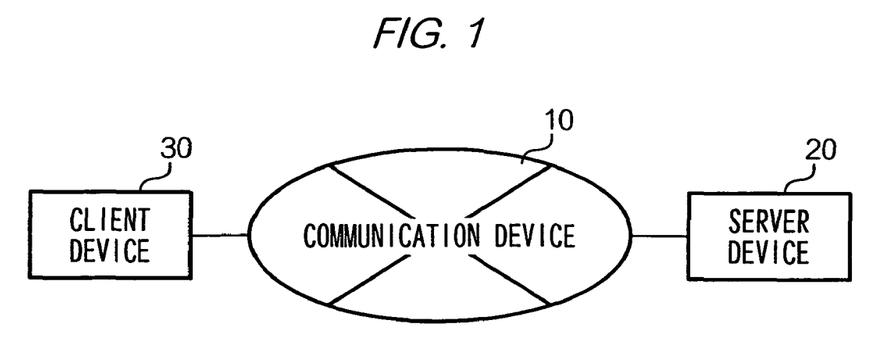
FIG. 1 is a diagram showing an example of a communication system comprising a server device 20 and a client device 30 according to a first embodiment of the present invention.

FIG. 1 is a diagram showing an example of an overall configuration of a communication system comprising a server device 20 and a client device 30 according to an embodiment of the present invention. As shown in FIG. 1, the communication system comprises a communication network 10 such as an Internet, server device 20 and client device 30 connected to communication network 10. While, in FIG. 1, only one client device and one server device connected to communication network 10 are shown, a number of client devices and/or a number of server devices may be connected to communication network 10. Hereinafter, a client device and a server device will be collectively referred to as a communication device where distinction between the two is unnecessary.

As shown in FIG. 1, communication network 10 comprises relay devices such as a router, a gateway, and the like. Communication network 10, when a message is transmitted from a communication device connected to the network according to a predetermined protocol (TCP in the present embodiment), delivers the message to its destination by routing the message via the relay devices. In the present embodiment, description will be given of a case where communication network 10 is the Internet; but communication network 10 may also be a LAN (Local Area Network), a mobile packet communication network, a wireless communication network such as a wireless LAN, and so on.

Server device 20 and client device 30 in FIG. 1 are personal computers (hereinafter, "PC") connected to communication network 10; and they are capable of establishing a connection and exchanging data according to TCP through communication network 10. Specifically, server device 20 and client device 30 generate a message under a format shown in FIG. 2, and transmit the message after writing predetermined data in an area of the header portion of the message, to thereby enable establishment of a connection and exchanges of data through the connection.

Figure 2:
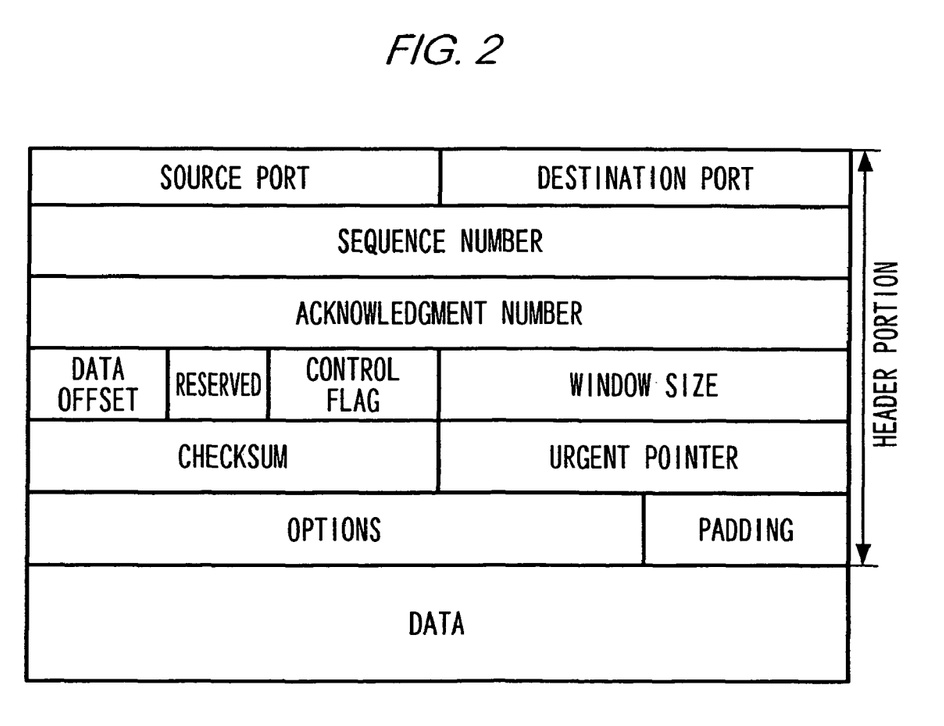
FIG. 2 is a diagram showing a message format exchanged according to TCP.

The format shown in FIG. 2 is that for a message transmitted according to TCP. Though a detailed graphic representation is omitted, a Control Flag area of FIG. 2 is an area for writing 6 bit flags: URG, ACK, PSH, RST, SYN, and FIN. Server device 20 and client device 30 set "1" or "0" to each of these 6 bit flags before transmitting each of the SYN, SYN/ACK, and ACK, and RST messages.

When a SYN message is transmitted from client device 30 to server device 20, respective data is written in each area of the header portion of the message. Namely, in a Source Port field, a communication port number of an application (a browser, etc.) which has requested start of communication is written; in a Destination Port field, a communication port number of a correspondent application (e.g., HTTPD) is written; and in a Sequence Number field an initial value of a sequence number used by server device 20 and client device 30 is written. In the Control Flag field, "1" is set only for the SYN flag, and "0" is set for other flags. It is to be noted, although it is not shown in FIG. 2, that a header is further appended to a message exchanged between server device 20 and client device 30 when the message is processed at a lower level of protocol than TCP (e.g., Internet Protocol: hereinafter "IP"). In the header added in the lower layer, there is written data representing a communication device that constitutes a destination and a source of the message (e.g., a communication address such as an IP address assigned to each device). That is, a SYN message transmitted from client device 30 to server device 20 includes a connection identifier of a downlink connection used when transmitting data from server device 20 to client device 30.

Server device 20 and client device 30 of FIG. 1 each comprises a function of establishing a connection according to a communication sequence (refer to FIG. 3) that is different from the above described 3-way handshake (refer to FIG. 10), the client puzzle protocol (refer to FIG. 11), or the client puzzle auction (refer to FIG. 12). In the following, a more detailed description will be given of server device 20 and client device 30.

A-2: Configuration of Server Device 20

Figure 4:
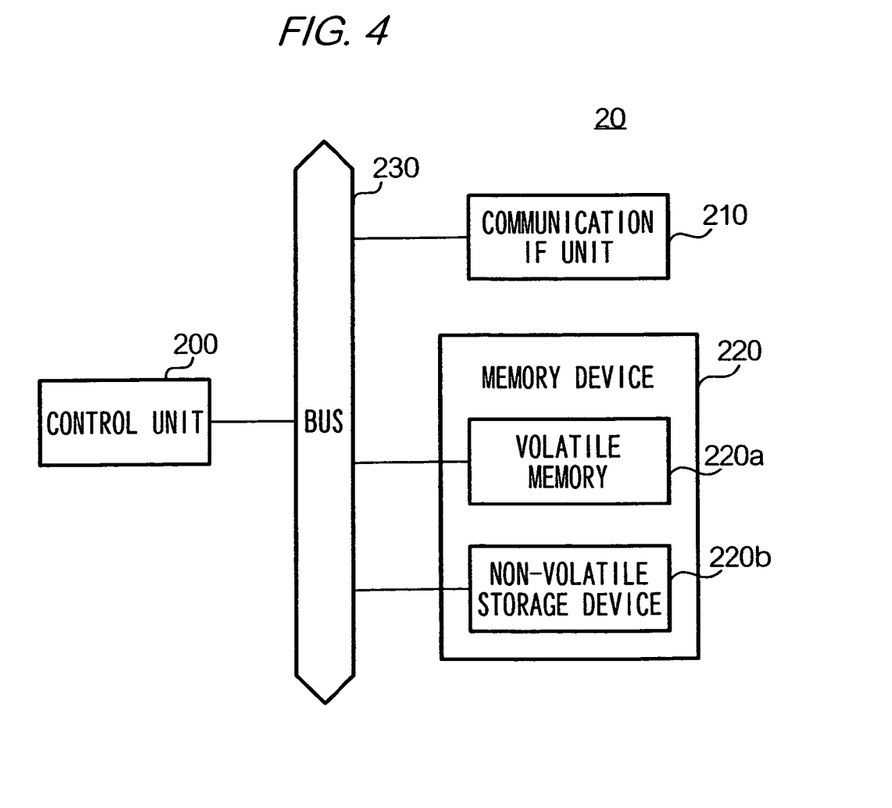
FIG. 4 is a diagram showing an example of a hardware configuration of server device 20.

Description will be now given of server device 20 with reference to FIG. 4. As shown in the figure, server device 20 has a control unit 200, a communication interface (hereinafter, "IF") unit 210, a memory device 220, and a bus 230 which interconnects each unit of device 20.

Control unit 200 is, for example, a CPU (Central Processing Unit), and controls each unit of server device 20 by running software stored in memory device 220. Communication IF unit 210, which is connected to communication network 10, receives a message transmitted via communication network 10, passes the message over to control unit 200, and transmits a message passed from control unit 200 to communication network 10.

Memory device 220, as shown in FIG. 4, comprises a volatile memory 220*a* and non-volatile storage device 220*b*. Volatile memory 220*a* is, for example, a RAM, and is used as a work area by control unit 200 operating according to software. Non-volatile storage device 220*b* is for example a hard disk, in which a variety of data is stored.

Examples of data stored in non-volatile storage device 220*b* include transmission data to be transmitted to client device 30 in response to a request from client device 30, and a plurality of data units (hereinafter, "server secret") used when generating a plurality of client puzzles having different levels of difficulty. In the present embodiment, description is given of a case where a plurality of server secrets is stored in non-volatile storage device 220*b*. Alternatively, a pseudo-random number generated according to a predetermined pseudo-random number generation algorithm (e.g., an M-sequence method or a mixed congruential method) may be used as a server secret. Further, a server secret may be generated by adding a predetermined value to such a pseudo-random number.

Further, there is stored in non-volatile storage device 220*b* an operating system (hereinafter, OS) software for causing control unit 200 to realize OS functions, and server software for causing control unit 200 to perform a process of establishing a connection according to the communication sequence shown in FIG. 3. Hereinafter, description will be given of functions provided to control unit 200 by executing the software.

When server device 20 is turned on, control unit 200 first runs and executes the OS software from non-volatile storage device 220*b*. Control unit 200 operating according to the OS software is provided with a function of controlling each unit of server device 20 and also with a function of running and executing other software from non-volatile storage device 220*b*. When control unit 200 completes the execution of the OS software, control unit 200 which has realized the OS immediately runs and executes the above server software from non-volatile storage device 220*b*.

Figure 5:
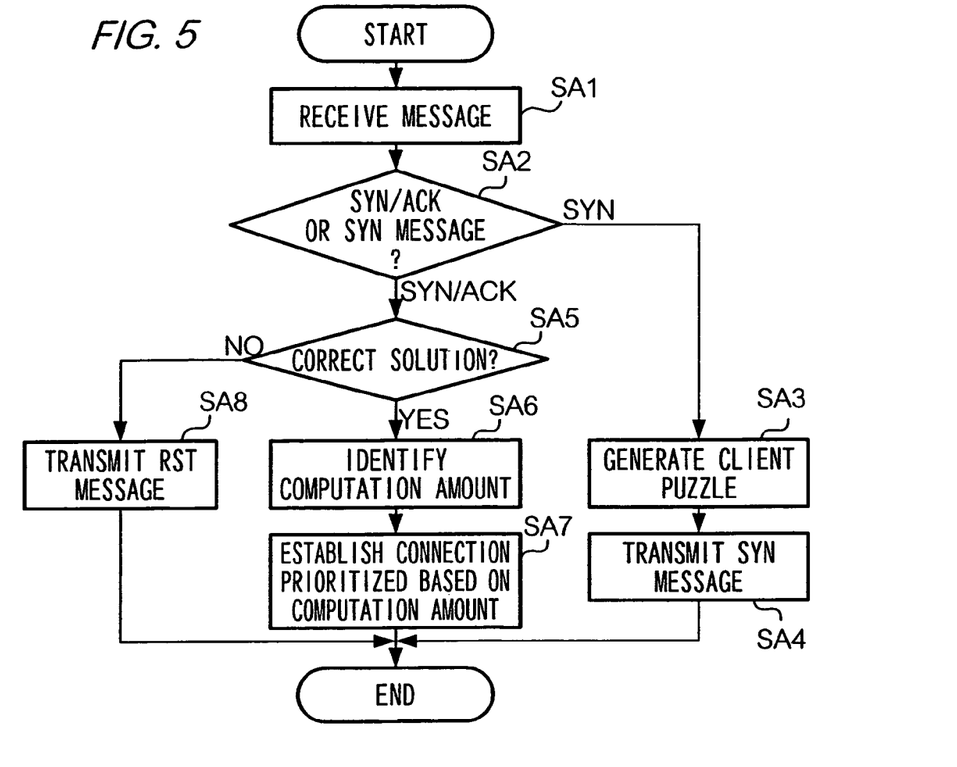
FIG. 5 is a flowchart showing a flow of a connection establishment process executed by a control unit 200 of server device 20 according to software.

A control unit 200 operating according to the server software are provided with the following three functions, when it receives via communication IF unit 210 a message requesting establishment of a downlink connection (FIG. 3: a SYN message 100) from client device 30, the functions for establishing a downlink connection with client device 30 according to a procedure shown in the flowchart of FIG. 5.

The first function provided to control unit 200 operating according to the server software is a function of executing a transmission (hereinafter, "transmission process") of a message through communication IF unit 210 to client device 30, the message requesting execution of one of a plurality of computations requiring a different computation amount and for requesting device 30 to reply a result of the computation, with the message being a SYN message 109 (FIG. 3) in the present embodiment. SYN message 109 includes a connection identifier designating an uplink connection between client device 30, and thus, message 109 is also for requesting establishment of an uplink connection to client device 30.

More specifically, control unit 200, according to the above first function, generates a plurality of client puzzles with different difficulty levels based on a connection identifier included in SYN message 100, receipt time data showing a time at which the message 100 is received, the time data being obtained by a time keeping means (not shown), and the plurality of server secrets, and writes each of the generated plurality of client puzzles in a particular area (Options field of FIG. 2 in the present embodiment) of SYN message 109 for transmission to client device 30.

In the present embodiment, when control unit 200 transmits SYN message 109, it writes in volatile memory 220*a* solutions of the plurality of client puzzles in association with the destination of the message 109. The stored data is used by control unit 200 to determine whether a solution transmitted from each client device 30 is correct. In the present embodiment, description is given of a case where a client puzzle is generated based on a connection identifier, receipt time data, and server secrets. Alternatively, at least one of a connection identifier, receipt time data, and server secrets may be used when generating a client puzzle. Further, a client puzzle may be generated by using additional data.

The Options field of FIG. 2 is used as a particular area for writing the generated plurality of client puzzles for the following reasons. In conventional techniques disclosed in Juels et. al and Wang et. al, a client puzzle is written in each area of Sequence Number, Urgent Pointer, and Window Size. However, since the total area size of the three areas is as much as 64 bits (i.e., 8 bytes), only one client puzzle can be written in one message. This is a reason why a plurality of messages needs to be transmitted as shown in FIG. 12.

On the contrary, the Options field is originally for writing data (hereinafter, "appendix data") for notifying availability of SACK Option and Timestamp Option, and is capable of storing as much data as 40 bytes. Thus, in the present embodiment, since the Options field is used for writing data of a client puzzle, a plurality of client puzzles with different levels of difficulty can be written in one SYN message 109. Accordingly, a request for execution of one of a plurality of computations with different computation amounts and a request for returning a result of the computation can be transmitted in one message.

In this case, data of a plurality of client puzzles may be written in the Options field in place of the above appendix data. Alternatively, data of a plurality of client puzzles may be included in the Options field together with the appendix data. In a case that a data size of a plurality of client puzzles and the appendix data exceed the storage capability of the Options field, only the client puzzles may be included in the Options field and the appendix data may be included in one or more of different areas of the same TCP header such as the Urgent Pointer field, Windows Size field, or Sequence Number field (FIG. 2). Still alternatively, the appendix data may be preferentially written in the Options field, and a plurality of client puzzles may be written in the same field using the remaining area of the Options field; in this case, if a size of the remaining area is not sufficient to accommodate all of the client puzzles, some of the client puzzles may be written in different areas of the same TCP header as described above.

Referring again to FIG. 5, the second function provided with control unit 200 operating according to the server software is a function of determining (hereinafter, "determination process") whether a solution represented by data of a computation result is correct, when receiving a message through communication IF unit 210 from client device 30, the message requesting execution of a given process and including in its Options field the computation result data representing a solution for one of a plurality of client puzzles, with the message being a SYN/ACK message 110 (FIG. 3) in the present embodiment. SYN/ACK message 110 is a message showing a receipt of SYN message 109 by client device 30 and requesting execution of a process for establishing a downlink connection.

The third function provided with control unit 200 operating under the server software is a function of, when it is determined that the solution of the client puzzle returned from client device 30 is correct, identifying an amount of computation executed at the same client device 30 based on the computation result data and of executing the given process (a process of establishing a downlink connection in the present embodiment) according to priority corresponding to the identified result.

Specifically, control unit 200 gives higher priority to a connection establishment request from a client device which has solved a client puzzle with a higher level of difficulty (i.e., a client device which has performed computation with a larger amount). In the present embodiment, description is given of a case where a process request from a client device which has solved a more difficult client puzzle is given higher priority when handling the request. Alternatively, a process request from a client device which has solved a less difficult client puzzle may be given higher priority when handling the request, as long as the process is executed according to priority depending on an amount of computation performed at the client device that is the source of the process request.

As in the foregoing, a hardware configuration of server device 20 is the same as that of a general computer device. In server device 20 of the present embodiment, a variety of software stored in non-volatile storage device 220b is run and executed by control unit 200, whereby control unit 200 is caused to realize three functions particular to the server device of the present invention. In other words, the server software is software for causing control unit 200 to function as transmission means for performing the transmission process, determination means for performing the determination process, and the process execution means for executing a process requested from a client device according to priority corresponding to an amount of computation executed by the client device.

In the present embodiment, description is given of a case where functions particular to the server device of the present invention are realized according to a software module. It is, of course, possible to configure server device 20 using a hardware module having the same functions as the software module; i.e., server device 20 may be configured by realizing the transmission means, the determination means, and the process execution means by using a hardware module, so that each means is operated according to a flowchart shown in FIG. 5.

A-3. Configuration of Client Device 30

Figure 6:
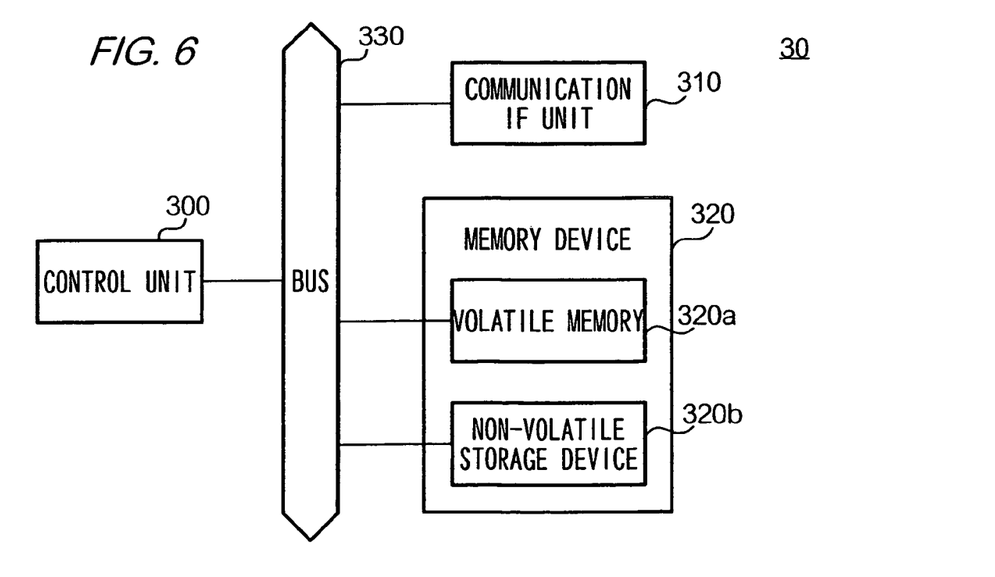
FIG. 6 is a diagram showing an example of a hardware configuration of client device 30.

Description will be given next of a configuration of client device 30 with reference to FIG. 6. As shown in FIG. 6, a hardware configuration of client device 30 differs from that of server device 20 in that there are provided in client device 30, a control unit 300, a communication IF unit 310, a memory device 320, and a bus 330. Provided in memory device 320 are a volatile memory 320a and a non-volatile storage device 320b, in place of volatile memory 220a and non-volatile storage device 220b. Client device 30, thus, has the same configuration as that of a general computer device as server device 20 does.

There is stored in non-volatile storage device 320b data and software particular to client device 30. Specifically, threshold data showing a process capability of client device 30, instead of a plurality of server secrets, is stored in non-volatile storage device 320b. The threshold data is used when selecting, from among a plurality of client puzzles transmitted from server device 20, a client puzzle which client device 30 will be solving, though, a more detailed description will be given below. In addition, in non-volatile storage device 320b, there is stored client software for causing control unit 300 to implement functions particular to a client device of the present invention, instead of the server software, in addition to the OS software. In the following, description will be given of functions provided to control unit 300 by executing the software.

When client device 30 is turned on, control unit 300 first runs and executes the OS software from non-volatile storage device 320b. Control unit 300 operating according to the OS software is provided with a function of controlling each unit of client device 30 and also with a function of running and executing other software from non-volatile storage device 320b. For example, when an instruction is given to run and execute the client software, control unit 300 runs and executes the client software from non-volatile storage device 320b. Control unit 300 operating according to the client software under the control of the OS is provided with a function of establishing a connection between server device 20 according to a flowchart of FIG. 7. In the following, description will be given of three functions provided to control unit 300 operating according to the client software.

A first function provided to control unit 300 operating according to the client software is a function of, when a message requesting execution of one of a plurality of computations requiring a different computation amount and requesting a reply including a result of the computation (SYN message 109 of FIG. 3 in the present embodiment), executing a process of identifying an amount of computation necessary for each of the plurality of computations and of selecting a computation to be executed, based on identified results (hereinafter, "selection process"). Specifically, control unit 300, when it receives SYN message 109 from server device 20, selects, based on a plurality of client puzzles included in message 109 and the threshold data, one client puzzle which client device 30 will be solving.

A second function provided to control unit 300 operating according to the client software is a function of executing a computation selected in the selection process. In the present embodiment, control unit 300 solves a client puzzle selected by the selection process to obtain a solution. A third function is a function of transmitting a message requesting execution of a given process, after writing in the message the computation result (i.e., the solution of the client puzzle). In the present embodiment, control unit 300 transmits SYN/ACK message 110 showing a receipt of SYN message 109 and requesting establishment of a downlink connection, after writing in the Options field (FIG. 2) of the message 110 the data of the computation results.

As in the foregoing, a variety of software stored in non-volatile storage device 320b is run and executed by control unit 300, whereby control unit 300 is caused to realize three functions particular to the client device of the present invention. The client software is software for causing control unit 300 to function as transmission means for performing the selection process, computation execution means for executing a computation selected by the selection process, and reply means for transmitting a message requesting execution of a given process, after writing a computation result by the computation execution means. In the present embodiment, description is given of a case where functions particular to the client device of the present invention are realized according to a software module. It is, of course, possible to configure a client device using a hardware module having the same functions as the software module; i.e., a client device may be configured by realizing the selection means, and the computation execution means, and the reply means by using a hardware module, so that each mean operates according to the flowchart shown in FIG. 7.

B. Operation

Description will next be given of an operation performed by server device 20 and client device 30, in particular of an operation which when carried out, clearly shows the characteristics of devices 20 and 30.

Figure 3:
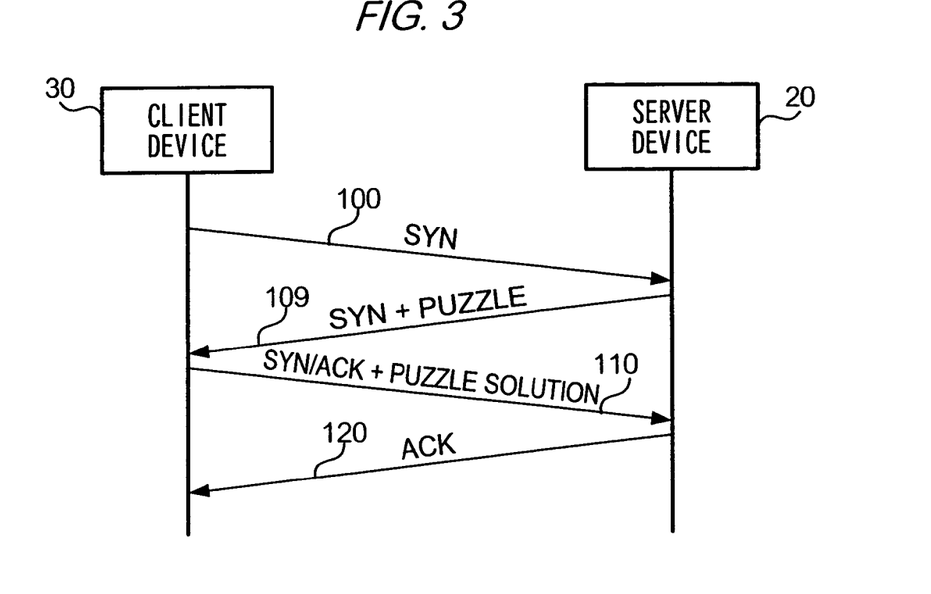
FIG. 3 is a diagram showing an example of a communication sequence followed when a connection is established between client device 30 and server device 20.

When a user performs a predetermined operation such as entering a URL of server device 20 by means of an operation unit (not shown), control unit 300 of client device 30 transmits SYN message 100 to server device 20, as shown in FIG. 3. In the following, description will be given, with reference to FIG. 5, of an operation performed by control unit 200 of server device 20 upon receiving SYN message 100.

Control unit 200, when it receives a message through communication IF unit 210, as shown in FIG. 5 (Step SA1), determines based on the content of the message whether the message is a SYN message or a SYN/ACK message (Step SA2). Specifically, control unit 200 determines when "1" is set only for the SYN flag of the Control Flag (FIG. 2) contained in the message, that the message is a SYN message; while it determines that the message is a SYN/ACK message when "1" is set to the ACK flag in addition to the SYN flag. Conversely, in a case that control unit 200 determines that the received message is a SYN message in Step SA2, it performs the process of Step SA3 in FIG. 5; while when control unit 200 determines that the received message is a SYN/ACK message in Step SA2, it executes the processes from Step SA5 and subsequent steps.

In the present example, given that SYN message 100 is transmitted from client device 30, it is determined in Step SA2 that the message received in Step SA1 is a SYN message, and the process of SA3 is performed. In Step SA3, control unit 200 generates a plurality of client puzzles having different levels of difficulty.

Figure 8:
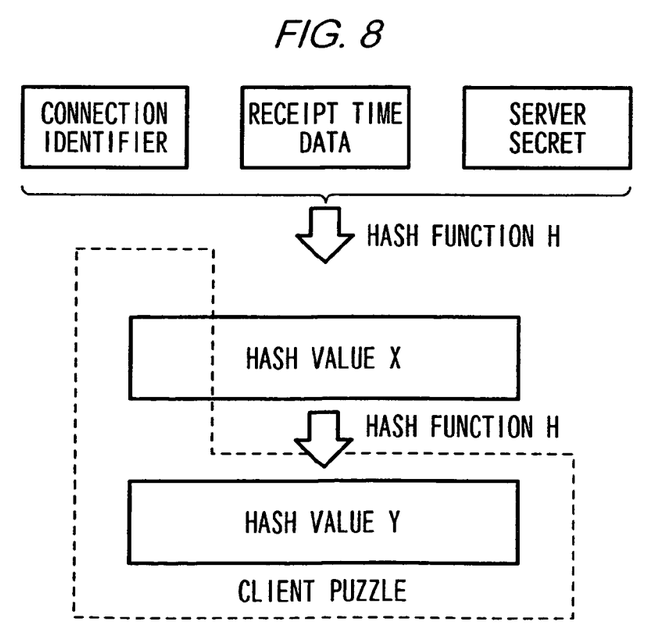
FIG. 8 is a diagram describing a client puzzle generated by server device 20.

FIG. 8 is a diagram describing a client puzzle generated by control unit 200. In Step SA3, control unit 200 first inputs, into a predetermined hash function H, a connection identifier contained in SYN message 100 received in Step SA1, receipt time data showing a reception time of message 100, and one of a plurality of server secrets stored in non-volatile storage device 220b, to obtain a hash value X of L bits. Control unit 200 subsequently enters the hash value X again into the hash function H, to obtain a hash value Y of L bits. Though in the present embodiment, description is given of a case where hash values X and Y have the same bit length, they may have different bit lengths.

Control unit 200 then generates as a client puzzle a pair of first k bits (where, $1 \leq k < L$) of the hash value X (hereinafter, "X<1, k>") and the hash value Y. This client puzzle is a computation for obtaining input data from which the hash value Y can be obtained using the predetermined hash function (hash function H in the present embodiment), the first k bits of the input data corresponding to X<1, k>. According to such a client puzzle, As the bit length of X<1, k> (i.e., k is closer to L) becomes longer, the amount of computation required for obtaining a solution of the client puzzle (i.e., X<k+1, L>) becomes lesser, though a detailed description will be given below.

Control unit 200 generates a plurality of client puzzles with varied value k, thereby generating a plurality of client puzzles having different levels of difficulty. Also, different server secrets may be used for each respective client puzzle.

In FIG. 5, control unit 200 generates SYN message 109 requesting client device 30 to establish an uplink connection, stores the destination of SYN message 109 in association with solutions (X<k+1, L> in the present embodiment) of a plurality of client puzzles, and transmits SYN message 109 after writing in its Options field (FIG. 2) the plurality of client puzzles (Step SA4) As a result, as shown in FIG. 3, SYN message 109 is transmitted from server device 20 to client device 30. In the following, a description will be given of an operation performed by control unit 300 of client device 30 when SYN message 109 is received, with reference to FIG. 7.

Figure 7:
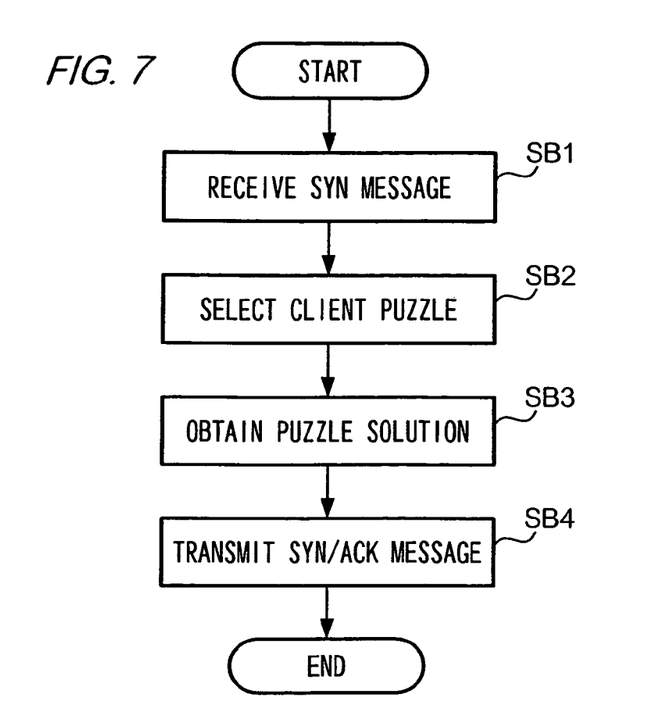
FIG. 7 is a flowchart showing a flow of a connection establishment process executed by a control unit 300 of client device 30 according to software.

Control unit 300, when it receives SYN message 109 (Step SB1), reads from message 109 the plurality of client puzzles and selects a client puzzle to be solved (i.e., a computation to be executed) based on an amount of computation for each client puzzle and threshold data stored in non-volatile storage device 320b (Step SB2). In the present embodiment, the data length of X<1, k> (i.e., k) shows a level of difficulty of each client puzzle, from among X<1, k> and Y included in each respective plurality of client puzzles. Accordingly, control unit 300, from among client puzzles including different X<1, k> not exceeding in its bit length a value shown by the threshold data, selects a client puzzle including X<1, k> having the longest bit length as a client puzzle to be solved.

Control unit 300 then executes a computation selected in Step SB2, and obtains a computation result (i.e., a solution of a client puzzle selected in Step SB2) (Step SB3). Specifically, control unit 300 obtains a solution of a client puzzle in such ways as follows. Control unit 300 first adds a bit string W having (L-k) bits with all of the bits set to OFF (i.e., "0"), to X<1, k> included in a client puzzle selected in Step SB2, to input into the predetermined hash function H, and checks whether an output hash value corresponds to Y of the client puzzle.

When they do not agree with each other, control unit 300 turns each bit of the bit string W to ON (i.e., "1") one by one, again for input into the hash function H, and repeats the process until an output hash value and Y come to agree with each other. When they come into agreement, control unit 300 then obtains the bit string W having agreed with value Y, as a solution of the client puzzle.

Control unit 300 then generates SYN/ACK message 110 showing receipt of SYN message 109 and requesting establishment of the downlink connection, writes computation result data showing the above computation result (W in the present embodiment) in message 110 for transmission to server device 20 (Step SB4). As a result, as shown in FIG. 3, SYN/ACK message 110 is transmitted from client device 30 to server device 20. Description will be given next, again referring to FIG. 5, of an operation performed by control unit 200 of server device 20 when SYN/ACK message 110 is received.

Control unit 200, upon receiving SYN/ACK message 110 through communication IF unit 210 (Step SA1), performs the processes on and after Step SA5 as described above. Specifically, control unit 200 first determines whether a computation result represented by computation result data included in the Options field of SYN/ACK message 110 received from client device 30 is correct (Step SA5). Specifically, control unit 200 checks whether the computation result data W agrees with any one of X<k+1, L> stored in association with the source of SYN/ACK message 110 (i.e., the destination of SYN message 109) in volatile memory 220a, and determines that the computation result is correct when it does.

Control unit 200, when a result of the determination of Step SA5 is negative, transmits a message showing refusal of a request from client device 30 (e.g., a RST message) (Step SA8), and ends the routine. Conversely, when a result of the determination of Step SA5 is affirmative, control unit 300, based on the computation result data, identifies an amount of computation executed by client device 30 (Step SA6). In the present embodiment, control unit 200 identifies the computation amount in accordance with the bit length of the computation result data W. In the present embodiment, it is identified that the longer the bit length of the computation result data W, the larger is an amount of computation performed by client device 30.

Control unit 200 then establishes a downlink connection according to a descending order of the computation amount identified in Step SA6, based on a connection identifier included in the SYN/ACK message received in Step SA1 (Step SA7). Subsequently, control unit 200, after Step SA7 is completed, transmits an ACK 120 showing receipt of the SYN/ACK message and completion of establishment of the downlink connection, and then ends the routine. As a result, as shown in FIG. 3, ACK 120 is transmitted from server device 20 to client device 30.

Control unit 300 of client device 30, upon reception of ACK 120, reads from ACK 120 a connection identifier showing an uplink connection, to establish the uplink connection based on the connection identifier. Thus, downlink and uplink connections are established between server device 20 and client device 30.

As in the foregoing, according to the present embodiment, a connection is established between server device 20 and client device 30 according to a priority basis corresponding to an amount of computation performed at client device 30. As an effect, a client device that has mounted a SYN Flood Attack by transmitting a large number of SYN messages to server device 20 of the present invention is required to solve as many client puzzles as the number of transmitted SYN messages. The client device then must commit large resources for solving client puzzles, whereby it becomes difficult for the client device to return, within a short time period, SYN/ACK message 110 in response to SYN message 109 transmitted from server device 20. Since no downlink connection is established at server device 20 unless SYN/ACK message 110 is returned, the SYN Flood Attack can be defended against.

A client device attempting a SYN Flood Attack might transmit a SYN/ACK message without actually solving a client puzzle but by only writing in the message a random value as a solution for the client puzzle; however, probability of such a random value coinciding to agree with a correct solution of a client puzzle is extremely low, and therefore, a request for establishment of a downlink connection will be refused by server device 20. A client device might also transmit a SYN/ACK message by solving the easiest client puzzle from among a plurality of client puzzles transmitted from server device 20. However, since a connection establishment request including a solution for the easiest client puzzle is handled with the lowest priority, the connection will not always be established. Thus, according to the present embodiment, a SYN Flood Attack can be defended without fail.

Further, according to the present embodiment, a plurality of client puzzles each having different levels of difficulty is collectively transmitted to client device 30 in one message. Therefore, an increase in communication traffic between client device 30 and server device 30 can be avoided.

C: Modification

In the foregoing, description has been given of a preferred embodiment of the present invention. However, modifications may be made as described below.

C-1: Modification 1

In the above embodiment, description is given of a case where server device 20 and client device 30 are PCs which communicate according to TCP. Alternatively, server device 20 and/or client device 30 may be a PDA or a mobile telephone which communicates according to TCP. Any computer device may be used as long as it communicates according to TCP. Further, description is given in the above embodiment that server device 20 and client device 30 communicate according to TCP, but it should be obvious that any other communication protocol may be used.

C-2: Modification 2

In the above embodiment, description is given of a case where solutions for client puzzles written in SYN message 109 are stored in association with the destination of SYN message 109 in server device 20. Alternatively, client puzzles such as in the following may be used, in which case solutions for the client puzzles need not be stored in server device 20.

Figure 9:
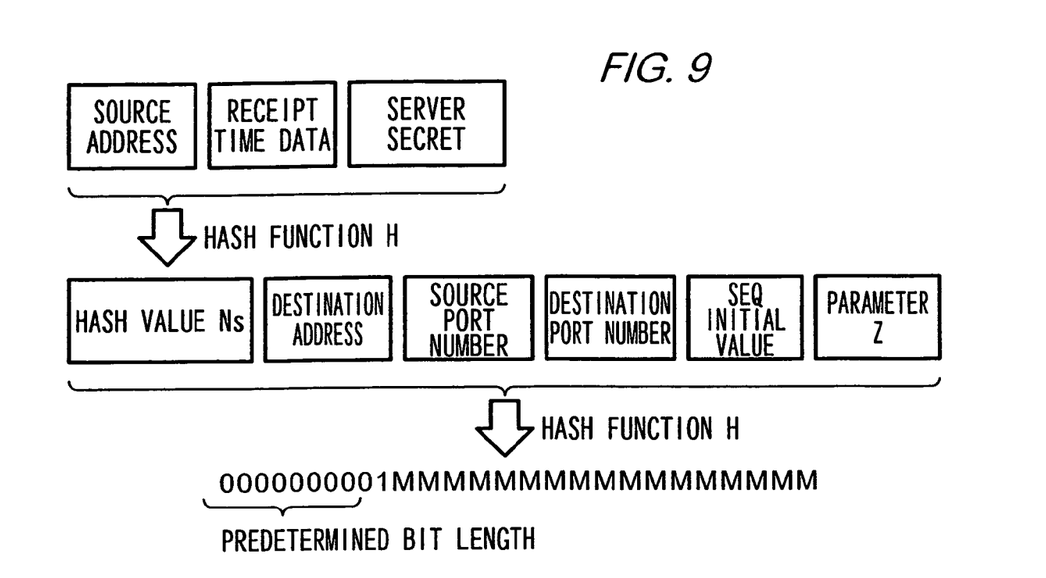
FIG. 9 is a diagram describing a client puzzle according to Modification 2.

FIG. 9 is a diagram for describing a client puzzle according to the present modification. As shown in the figure, according to the client puzzle, a hash value Ns is a value obtained by entering into a predetermined hash function H, a server secret, receipt time data showing a time at which SYN message 100 is received, and a source address (i.e., an IP address of client device 30). A hash value is then obtained by entering into the hash function H, the hash value Ns, a destination address (an IP address of server device 20), source and destination port numbers, an initial value of a sequence number, and a given parameter Z, with all of the bits in a predetermined bit length of a first portion of the hash value being set to "0". A pair of the hash value Ns and the predetermined bit length are transmitted to client device 30 when this type of client puzzle is used; and a solution of the client puzzle is the parameter Z. In the client puzzle, the predetermined bit length shows difficulty of the client puzzle; as the bit length becomes, the level of difficulty becomes higher.

When the client puzzle of FIG. 9 is used, server device 20 only has to transmit, as a client puzzle, data showing the hash value Ns and the predetermined bit length to client device 30. When a solution Z of the client puzzle is transmitted from client device 30, a computation shown in FIG. 9 is executed to determine whether the transmitted solution is correct. Thus, when a client puzzle of FIG. 9 is used, server device 20 need not execute a computation in advance to obtain its solution for storage, but only has to store data showing the hash value Ns and the predetermined bit length transmitted to client device 30, in association with a communication address of the device 30, in order to determine whether a solution transmitted from client device 30 is correct. In this way, since no computation for generating a client puzzle needs to be performed prior to transmission of SYN message 109, message 109 can be promptly transmitted to client device 30.

Further, a computation for a client puzzle is not limited to a computation using a hash function, but may be a computation for obtaining a solution for an algebraic equation such as an n ($n \geqq 3$)-degree equation and a system of linear equations. In this case, data showing an n-degree equation or a simultaneous equation (e.g., in a case that an algebraic equation of a cubic equation $aX3+bX2+cX+d=0$ is used, coefficients a, b, c, and d) may be used as a client puzzle, where a number of coefficients used in the algebraic equation corresponds to an amount of computation.

C-3: Modification 3:

In the above embodiment, description is given of a case where a client device is caused to solve one of a plurality of client puzzles transmitted from a server device, but a client device may be caused to solve more than one client puzzle, in which case all of the solutions may be included in SYN/ACK message 110. When a server device receives SYN/ACK message 110 including a plurality of solutions, the device may identify an amount of computation executed by a client device based on one of the solutions (e.g., a solution of the most difficult or the easiest client puzzle) or on the plurality of solutions. For example, a server device may identify an amount of computation performed by a client device by totaling an amount of computation performed for client puzzles corresponding to respective solutions.

C-4: Modification 4

In the above embodiment, when a request is transmitted from a client device for establishing a connection, a server device establishes a connection on a priority basis depending on a level of difficulty of a client puzzle to be solved by the client device. However, a process performed by a server device in response to a request from a client device is not limited to a connection establishment process but may be a process of generating data according to a predetermined algorithm, storing the data (e.g., in a database), or forwarding the data to a given destination. It may be a process of transmitting a given data to a client device in response to a request from the client device.

Where the present invention is applied to a server device performing such a process of generating data according to a predetermined algorithm, the server device might receive, in the midst of executing a process for a client device, another request from another client device which has performed a computation whose amount is larger than that of a computation performed by the client device for which the server device is currently executing the process. In such a case, a priority order of the currently executed process may be lowered by using a system call (e.g., a nice system call according to Unix®), so that the other request can be preferentially executed. Further, in the present modification, a RST message, instead of SYN message 109, may be used for transmitting a plurality of client puzzles.

Thus, according to the present modification, a technique of the present invention can be used not only for defending against a SYN Flood Attack but for causing a server device which performs a given process in response to a request from a client device, to execute the process according to a priority based on a burden the client device has shouldered.

C-5: Modification 5

In the above embodiment, description is given of a case where a SYN message requesting establishment of a connection is first transmitted to a server device, and then the server device is caused to transmit a plurality of client puzzles having different levels of difficulty, collectively to the client device. Alternatively, a server device may be first caused to, after establishing connections with a plurality of client devices, transmit a plurality of client puzzles to each client device before receiving a process request from each client device. A process may be executed by a server device only when a request for the process is transmitted including a client puzzle solution. According to the present modification, a server device is able to control frequency of process requests received from a client device, whereby possible congestion can be avoided before it happens.

Conversely, no such modification is possible to the techniques disclosed in the prior art, Juels, et. al and Wang, et. al since a client puzzle is written in Sequence Number, Urgent Pointer, and Window Size areas of a TCP header since use of these areas of a TCP header should not be diverted to writing a client puzzle after a connection is established, for data included in Sequence Number and Urgent Pointer is updated each time data is exchanged between a server device and a client device via the established connection. The TCP Options field, on the other hand, may be used for writing a client puzzle even after the connection is established since this area is used for writing the above described appendix data which is data for notifying availability of SACK Option and Timestamp Option before a connection is established, and thus, using TCP Options field for writing client puzzles could cause few problems.

C-6: Modification 6

In the above embodiment, software is stored in advance in non-volatile storage device 220b for causing a control unit to realize functions particular to the server device of the present invention. For storing the software, other computer-readable media such as a CD-ROM (Compact Disk Read Only Memory), DVD (Digital Versatile Disk) and the like may be used, and the software may be installed in a general computer device using such media. In this way, it is possible to cause a server device in an existing communication system to function as a server device according to the present invention. Similarly, software for causing a control unit to realize functions particular to the client device of the present invention may be stored in a recording medium such as the above, and the software may be installed in a general computer device using such media.

The invention claimed is:

1. A process execution method comprising:

generating with a server device a first message comprising a plurality of client puzzles, each of said client puzzles requiring a different amount of computation to solve;

collectively transmitting in said first message from said server device to a client device, said plurality of client puzzles, a request for computation of a solution to one of said client puzzles, and a request for transmission of said solution to said server;

receiving said first message at said client device;

said client device identifying, based on said different amount of computation of each of said client puzzles, an amount of computation to be performed for each of said client puzzles;

said client device selecting a single client puzzle from among the plurality of client puzzles included in said first message based on a level of computational complexity of said selected client puzzle;

said client device executing a computation at a corresponding level of complexity to solve said selected client puzzle;

said client device generating and transmitting a second message comprising a request for execution of a predetermined process and a computed solution of said selected client puzzle;

said server device receiving said second message;

said server device confirming said computed solution is correct;

said server device, when said computed solution is confirmed to be correct, identifying, based on said computed solution, an amount of computation executed by said client device to solve said selected client puzzle; and said server device executing said predetermined process according to a priority determined based on said amount of computation.

2. The process execution method of claim 1, wherein generating with a server device a first message comprising a plurality of client puzzles further comprises writing said plurality of client puzzles in a data area of a header of a predetermined communication protocol, and collectively transmitting said first message comprises transmitting said first message in said predetermined communication protocol.

3. The process execution method of claim 2, wherein said client device generating and transmitting a second message comprises writing said computed solution of said selected puzzle into said data area included in said predetermined communication protocol.

4. The process execution method of claim 1, further comprising generating said plurality of client puzzles each at different difficulty levels based on a connection identifier of said client device.

5. The process execution method of claim 1, wherein collectively transmitting in said first message from said server device to said client device comprises transmitting all of said plurality of client puzzles, said request for computation of said solution to one of said client puzzles, and said request for transmission of said solution to said server device in a single message.

6. The process execution method of claim 1, wherein said client device selecting said single client puzzle from the plurality of client puzzles comprises selecting said single client puzzle to match a computational capability of said client device.

7. A server device comprising:
a processor configured to generate and direct transmission of a first message to a client device, said first message including a plurality of client puzzles transmitted together in said first message, each of said plurality of client puzzles having a different level of difficulty and including a data set for use in computation of a respective solution, each respective solution requiring a different amount of computation by said client device, said plurality of client puzzles being transmitted in said first message with a request for selection by said client device of one of said client puzzles from said first message based on a difficulty level of said one of said client puzzles as determined by said client device, and a request for transmission of a computation result;

said processor further configured to receive a second message from said client device, said second message requesting execution of a predetermined process and including said computation result for said one of said client puzzles selected by said client device in response to said request;

said processor further configured to confirm said computation result is correct;

said processor, responsive to said computational result being correct, further configured to identify an amount of computation carried out by said client device to arrive at said computation result; and said processor further configured to establish a level of priority of a communication connection with said client device based on said amount of computation carried out by said client device to arrive at said computation result.

8. A server device according to claim 7, wherein said processor is further configured to generate each of said client puzzles having different levels of difficulty using respective different data units, said respective different data units being pre-determined stored values, or pseudo-random numbers generated with said processor.

9. A server device according to claim 7, wherein said processor is configured to generate and direct transmission of said first message in response to receipt of a preliminary message requesting only execution of said predetermined process, said preliminary message received from said client device.

10. A server device according to claim 9, wherein said preliminary message includes a connection identifier, and said processor is further configured to generate said plurality of client puzzles with a progressively increasing range of difficulty based on said connection identifier.

11. A server device according to claim 7, wherein said first message is generated with a predetermined protocol that includes a predetermined data area in which appendix data is contained only after establishment of said communication connection between said server device and said client device, said appendix data notifying said client device of detailed modes of communication with said server device; and wherein said processor is further configured to generate said first message to include said plurality of client puzzles in said predetermined data area.

12. A server device according to claim 11, wherein said second message is generated with said predetermined protocol that includes said predetermined data area, and said computational result is included in said predetermined data area in said second message.

13. A server device according to claim 11, wherein said predetermined protocol is a TCP (Transmission Control Protocol); and wherein said predetermined data area is an Options field included in a header of said TCP (Transmission Control Protocol).

14. A client device comprising:
a transceiver configured to receive a first message from a server device that includes a plurality of client puzzles collectively transmitted in said first message, a request for computation of a solution to one of said client puzzles, and a request for transmission of said solution for receipt and verification by said server device, each of said plurality of client puzzles having a different level of computational difficulty;

a processor coupled with said transceiver, said processor configured to select from said first message one of said client puzzles for solution based on a corresponding computational difficulty of said one of said client puzzles;

said processor further configured to execute a computation to solve said selected one of said client puzzles and generate a computation result indicative of computational difficulty of said selected one of said client puzzles; and said transceiver further configured to transmit a second message to said server device as directed by said processor, said second message including a process execution request and said computation result, said computation result used by said server device to determine said computational difficulty of said selected one of said client puzzles, and to establish a priority for execution of said process execution request.

15. A client device according to claim 14, wherein said processor is further configured to generate and direct transmission via said transceiver of a preliminary message to said server device, said preliminary message including only a process execution request, said first message responsive to said process execution request.

16. A client device according to claim 14, wherein said client device includes a memory in communication with said processor, said memory including threshold data indicating a computational capability of said client device, said processor configured to select said one of said client puzzles from among said client puzzles included in said first message in accordance with said threshold data.

17. A client device according to claim 14, wherein said first message is a SYN message, and said second message is a SYN/ACK message.

18. A server device comprising:
communication means; and
a processor coupled with said communication means, said processor configured to execute:
a first process to transmit a first message to a client device via said communication means, said first message including a plurality of client puzzles, each of said plurality of client puzzles including a data set requiring a different amount of computation by said client device, said plurality of client puzzles transmitted with a request to said client device to select one of said client puzzles for computation by said client device based on a difficulty level of said one of said client puzzles as determined by said client device, and a request for transmission to said server device of said a solution to said selected one of said client puzzles;
a second process to receive said solution to said selected one of said client puzzles in a second message from said client device via said communication means;
a third process to determine whether said solution received in said second message is correct, said second message including a request from said client device for execution of a given process;
a fourth process to identify a level of complexity of computation carried out by said client device to achieve said solution to said selected one of said client puzzles, said fourth process executed in response to said solution being determined to be correct; and
a fifth process to prioritize execution of said given process requested by said client device based on said level of complexity of said computation amount.

19. The server device of claim 18, wherein said fourth process to identify a level of complexity of computation carried out by said client device comprises evaluating a bit length of said solution received in said second message.

20. The server device of claim 18, wherein said fifth process to prioritize execution of said given process requested by said client device based on said level of complexity of said computation amount comprises a sixth process to increase a priority of execution of said given process in response to said level of complexity exceeding a predetermined level.

21. A client device comprising:
communication means; and
a control unit connected with said communication means, said control unit configured to execute:
a first process to receive a first message with said communication means, said first message including a plurality of client puzzles, each of said plurality of client puzzles including a data set requiring a different amount of computation by said client device to solve, said first message also including a request to said client device to select one of said client puzzles for computation of a solution, and a request for transmission of said solution to a server device for validation;
a second process to identify, based on analysis of each of said client puzzles, a computation amount to be performed for each of said client puzzles to obtain a respective solution;
a third process to select a single client puzzle from among said plurality of client puzzles to solve based on said identified computation amount of said selected client puzzle;
a fourth process to solve said selected client puzzle; and
a fifth process to transmit a second message for receipt by said server device, said second message including a solution to said selected client puzzle and a request to said server device to execute a given process, said solution used by said server device to confirm said identified computation amount and assign a corresponding priority to execution of said given process.

22. A client device according to claim 21, wherein said third process to select said single client puzzle from among said plurality of client puzzles to solve based on said identified computation amount of said selected client puzzle comprises comparison of said identified computation amount to threshold data stored in said client device, said threshold data indicative of a process capability of said client device.

* * * * *